(12) United States Patent  
Seo et al.

(10) Patent No.: US 7,164,845 B2  
(45) Date of Patent: Jan. 16, 2007

(54) METHOD FOR MAKING MULTI-PATH DATA STREAM ACCEPTABLE IN A HIGH-DENSITY RECORDING MEDIUM

(75) Inventors: Kang-Soo Seo, Kyunggi-do (KR); Jea-Yong Yoo, Seoul (KR); Byung-Jin Kim, Kyunggi-do (KR); Hyung-Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1043 days.

(21) Appl. No.: 09/862,487

(22) Filed: May 23, 2001

(65) Prior Publication Data

US 2001/0047378 A1    Nov. 29, 2001

(30) Foreign Application Priority Data

May 23, 2000    (KR)  ............................... 2000-27828

(51) Int. Cl.  
H04N 5/91    (2006.01)

(52) U.S. Cl. ......................................... 386/95; 386/112

(58) Field of Classification Search ................... 386/46, 386/95, 98, 111, 112, 125, 126  
See application file for complete search history.

(56) References Cited

U.S. PATENT DOCUMENTS 5,771,334 A * 6/1998 Yamauchi et al. ............ 386/95

6,470,140 B1 * 10/2002 Sugimoto et al. ............. 386/95  
6,546,195 B1 * 4/2003 Kashiwagi et al. .......... 386/126

FOREIGN PATENT DOCUMENTS

| JP | 9-23403 A | 1/1997 |
|---|---|---|
| WO | 97/13365 A1 | 4/1997 |

* cited by examiner

Primary Examiner—Huy Nguyen  
(74) Attorney, Agent, or Firm—Birch, Stewart, Kolasch & Birch, LLP

(57) ABSTRACT

The present invention relates to a method for making multi-path data stream acceptable in a high-density recording medium. A data stream recording method according to the present invention, records data stream in a recording medium, groups multi-path stream section of the recorded data stream into a single stream object, creates time entries having location information indicating each boundary position between stream segments of different path wherein each time entry contains type information indicating whether related data stream interval is for multi-path or not, and records the created time entries. This multi-path data stream accepting method prevents searching error which might be caused from multi-path data stream in a high-density recording medium in reproducing mode.

22 Claims, 5 Drawing Sheets

| | TM_ENT_TY | Type of Time Entry | 1 Byte |
|---|---|---|---|
| | Reserved | Reserved | 1 Byte |
| | ST_HOBU_IDX | Index Number of Start HOBU Entry for this Time Entry | 2 Byte |
| | ACC_SZ | Accumulated Size | 4 Byte |
| | Reserved | Reserved | 1 Byte |
| | ACC_TM | Accumulated Time Length | 3 Byte |

| b7 | b6 | b5 | b4 | b3 | b2 | b1 | b0 |
|---|---|---|---|---|---|---|---|
| TM_ENT_TY | | reserved | | | | | | b7,b6 = 00 : time enty is not in multi path area  
b7,b6 = 01 : time enty is in multi path area  
b7,b6 = others : reserved Mapping List (MAPL):

| Time Entry 1 (TM_ENT 1) |
|---|
| Time Entry 2 (TM_ENT 2) |
| ⋮ |
| HOBU Entry 1 (HOBU_ENT 1) |
| HOBU Entry 2 (HOBU_ENT 2) |
| ⋮ |

Mapping List General Information (MAPL_GI)

| | | Size |
|---|---|---|
| TM_ENT_IT | Time Entry Interval | 1 Byte |
| Reserved | Reserved | 1 Byte |
| TM_ENT_Ns | Number of Time Entries | 2 Byte |
| Reserved | Reserved | 1 Byte |
| HOBU_ENT_Ns | Number of HOBU Entries | 3 Byte |

FIG. 3

| Field Name | Contents | Size |
|---|---|---|
| TM_ENT_TY | Type of Time Entry | 1 Byte |
| Reserved | Reserved | 1 Byte |
| ST_HOBU_IDX | Index Number of Start HOBU Entry for this Time Entry | 2 Byte |
| ACC_SZ | Accumulated Size | 4 Byte |
| Reserved | Reserved | 1 Byte |
| ACC_TM | Accumulated Time Length | 3 Byte |

| b7 | b6 | b5 | b4 | b3 | b2 | b1 | b0 |
|---|---|---|---|---|---|---|---|
| STRM_TY | | reserved | | STRM_N (Path Number) | | | | b7,b6 = 00 : time enty is not in multi path area
b7,b6 = 01 : time enty is in multi path area
b7,b6 = others : reserved

FIG. 4

| b31 | b30 | b29 | b28 | b27 | b26 | b25 | b24 |
|---|---|---|---|---|---|---|---|
| 1 STREF_SZ (Upper) | | | | | | | |

| b23 | b22 | b21 | b20 | b19 | b18 | b17 | b16 |
|---|---|---|---|---|---|---|---|
| 1STREF_SZ (Lower) | | HOBU_PD | | | | | |

| b15 | b14 | b13 | b12 | b11 | b10 | b9 | b8 |
|---|---|---|---|---|---|---|---|
| HOBU_SZ (Upper) | | | | | | | |

| b7 | b6 | b5 | b4 | b3 | b2 | b1 | b0 |
|---|---|---|---|---|---|---|---|
| HOBU_SZ (Lower) | | | | GOP_Ns | | | |

FIG. 6

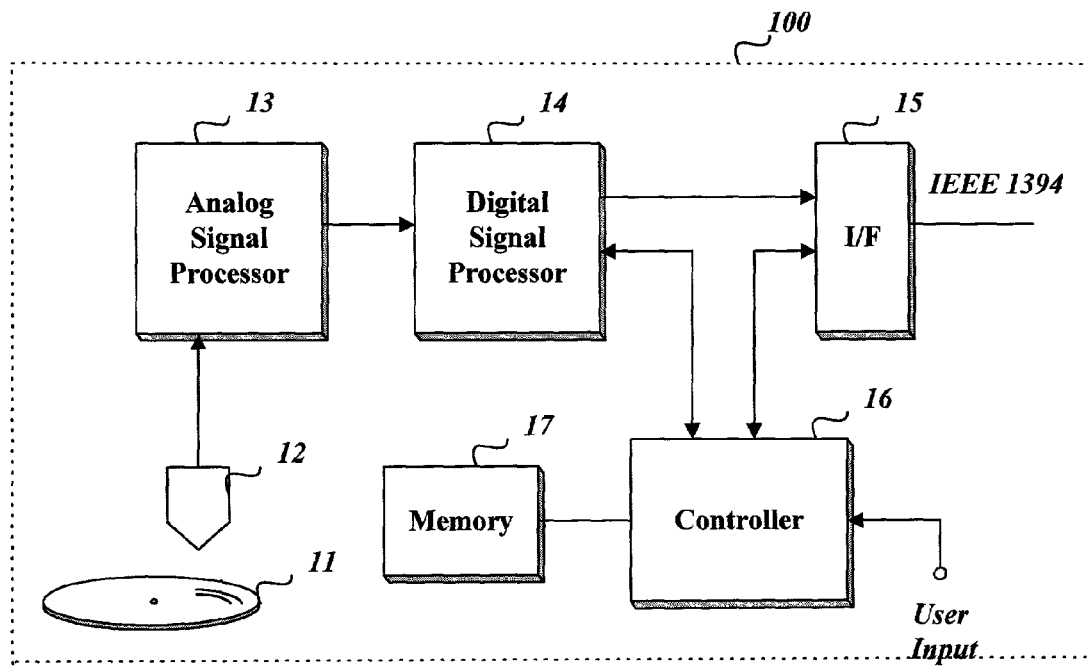

FIG. 7

| Field Name | Contents | Size |
|---|---|---|
| TM_ENT_TY | Type of Time Entry | 1 Byte |
| Reserved | Reserved | 1 Byte |
| ST_HOBU_IDX | Index Number of Start HOBU Entry for this Time Entry | 2 Byte |
| INC_SZ | Incremental Size of this Time Entry | 2 Byte |
| Reserved | Reserved | 1 Byte |
| INC_TM | Incremental Time Length of this Time Entry | 2 Byte |

| b7 | b6 | b5 | b4 | b3 | b2 | b1 | b0 |
|---|---|---|---|---|---|---|---|
| STRM_TY | | reserved | | STRM_N (Path Number) | | | | b7,b6 = 00 : time enty is not in multi path area
b7,b6 = 01 : time enty is in multi path area
b7,b6 = others : reserved

METHOD FOR MAKING MULTI-PATH DATA STREAM ACCEPTABLE IN A HIGH-DENSITY RECORDING MEDIUM

BACKGROUND OF THE INVENTION

1. Field of the Invention

The present invention relates to a method for making multi-angle or multi-story streams be supported in a next generation recording medium such as a high-density DVD (Digital Versatile Disk), and a method for searching data streams including multi-angle or multi-story streams recorded according to said supporting method.

2. Description of the Related Art

In these days, a digital television being able to present high-quality pictures is being spread rapidly and widely.

A high-density DVD player is also being developed. A high-density DVD player aims to reproduce data written in a high-density DVD (called 'HDVD' hereinafter) of a next generation recording medium, whose recording standard is under discussion at present.

For better presentation of data reproduced from a HDVD player, a HDVD player is likely to be connected to a digital television through a digital interface such as IEEE 1394 standard.

In the meantime, a DVD-ROM, which is widely used as a large-capacity recording medium at present, may contain one or more multi-angle or multi-story stream sections. A multi-angle stream has different scenes viewed from different angles and a multi-story stream has different stories in its stream segments. Hereinafter, the word of 'multi-path' means multi-angle or multi-story.

When a multi-path stream section is encountered in reproduction of a DVD-ROM, a user can select desired viewing angle or story at each branching point.

Because the existing DVD-ROM can support multi-path stream, a high-density DVD, whose recording standard is under discussion, should also support multi-path stream. However, a tentative basic standard of a high-density DVD has a different navigation data structure, for example a TMAP table included, from the existing DVD-ROM, so that the multi-path supporting structure of presentation and navigation data of a DVD-ROM is not applicable to a high-density DVD.

Therefore, new structures of presentation and navigation data should be developed to support multi-path streams in a high-density DVD of a next generation recording medium.

SUMMARY OF THE INVENTION

It is an object of the present invention to provide a multi-path data stream supporting method of a high-density recording medium, which groups recorded multi-path data stream section into a single stream object, and creates time entries containing multi-path information such that there should be time entries having location information for every boundary between stream segments whose paths are different.

It is another object of the present invention to provide a data stream searching method being able to prevent searching error due to multi-path data stream by using the information written in said time entries.

A data stream recording method according to the present invention, records data stream in a recording medium, groups multi-path stream section of the recorded data stream into a single stream object, creates time entries having location information indicating each boundary position between two stream segments of different paths, and records the created time entries.

A data stream searching method according to the present invention, searches for a time entry whose accumulated time length is closest to a target value when an searching operation is requested, checks whether a path information written in the time entry found in the previous step is equal to an entered path number, and searches for a location of recorded data stream pointed by an accumulated size information written in the found time entry, based on the checked result.

Another data stream searching method according to the present invention, sums up incremental time length and incremental size written in each time entry, determines a time entry whose incremental time length makes the summed time length closest to a target value, checks whether a path information written in the determined time entry is equal to an entered path number, and searches for a location of recorded data stream close to a position of the target value, based on the checked result.

A recording medium containing data stream including multi-path data stream according to the present invention, are composed of a number of stream object units constituting data stream and a number of time entries, each having navigation information for each of several stream object units, wherein multi-path stream section of the data stream is grouped into a single stream object and there should be time entries having location information pointing each boundary between stream segments of different path which are located in the multi-path stream section.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 3 shows field syntax of a time entry which is a member of the mapping list;

FIG. 4 shows field syntax of a high-density stream object unit entry which is a member of the mapping list;

FIG. 6 is a block diagram of a disk device reproducing a high-density DVD containing data stream recorded according to the present invention; and FIG. 7 shows another field syntax of a time entry according to the present invention.

DETAILED DESCRIPTION OF THE PREFFERRED EMBODIMENT

In order that the invention may be fully understood, a preferred embodiment thereof will now be described with reference to the accompanying drawings.

Figure 1:
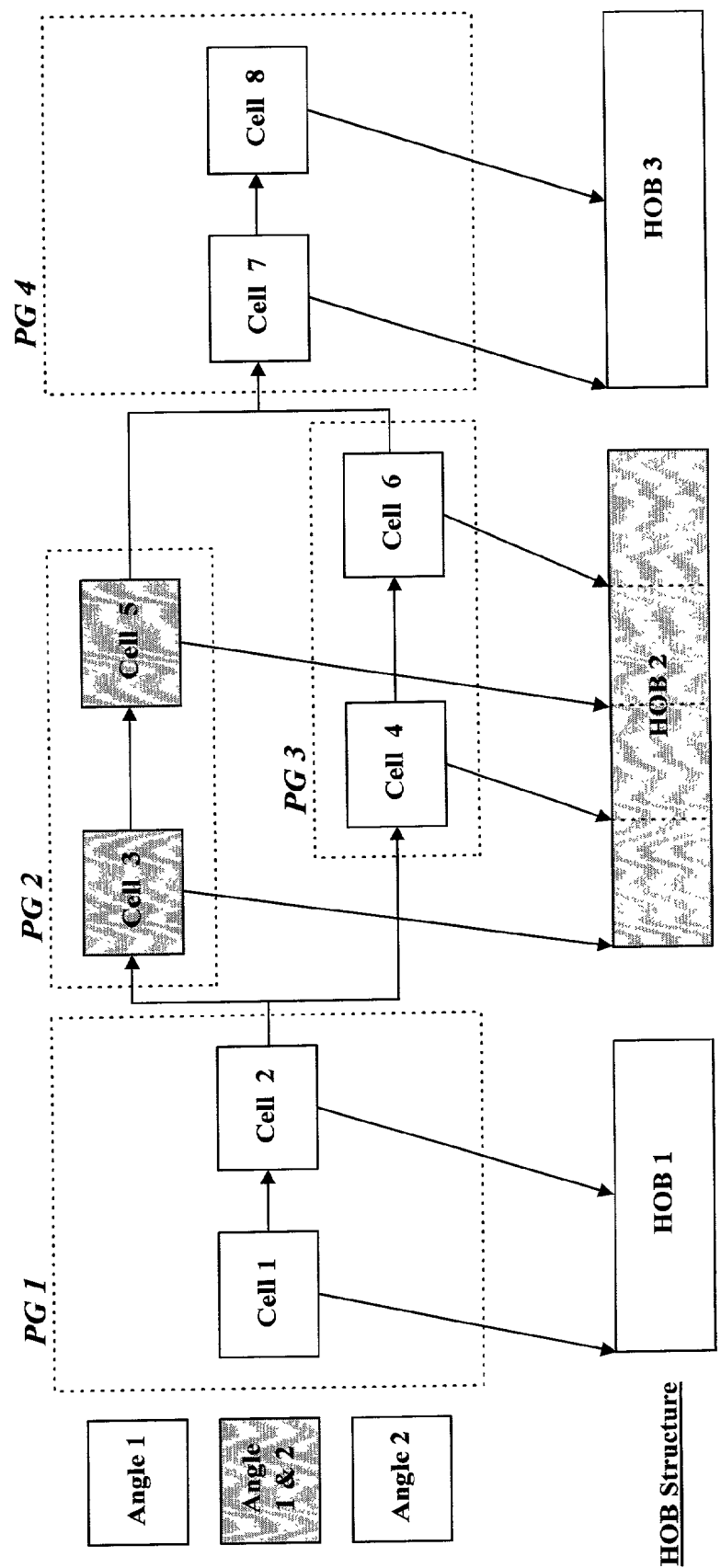
FIG. 1 shows a recorded stream example in which a multi-path data stream section is grouped into a single high-density stream object according to the present invention.

According the present invention, a HDVD is manufactured or data streams are recorded in a HDVD such that a stream section containing a multi-path data stream is grouped in a single high-density stream object (called 'HOB' hereinafter). FIG. 1 shows a recorded stream example formed according to the present invention. In FIG. 1, a VTS (Video Title Set) is composed of two uni-path stream objects of programs PG1 and PG4 and single two-path stream object of programs PG2 and PG3 which are corresponding to data stream of each path, respectively.

For uni-path data stream information, the program PG1 contains two cells C1 and C2 indicative of start and some point of HOB 1, respectively, and the program PG4 contains cells C7 and C8 indicative of start and some point of HOB 3, respectively. For multi-path data stream information, cells C3 and C5 belonging to the program PG2 and cells C4 and C6 belonging to the program PG3 are indicative of each start point of stream segments of two-path stream object HOB2, respectively.

And, each stream segment is interleaved in the multi-path stream object HOB2 such that segments of same time to reproduce are close physically each other. Stream sections of programs PG2 and PG3 associated with each path have a same time length.

Each stream object HOB is composed of many high-density stream object units (called 'HOBU' hereinafter). Because a MAPL (MAPping List) is mandatory for quick search for an arbitrary target HOBU or quick random access in a high-density DVD, a MAPL should have suitable structure to the aforementioned recording method of multi-path data stream.

Figure 2:
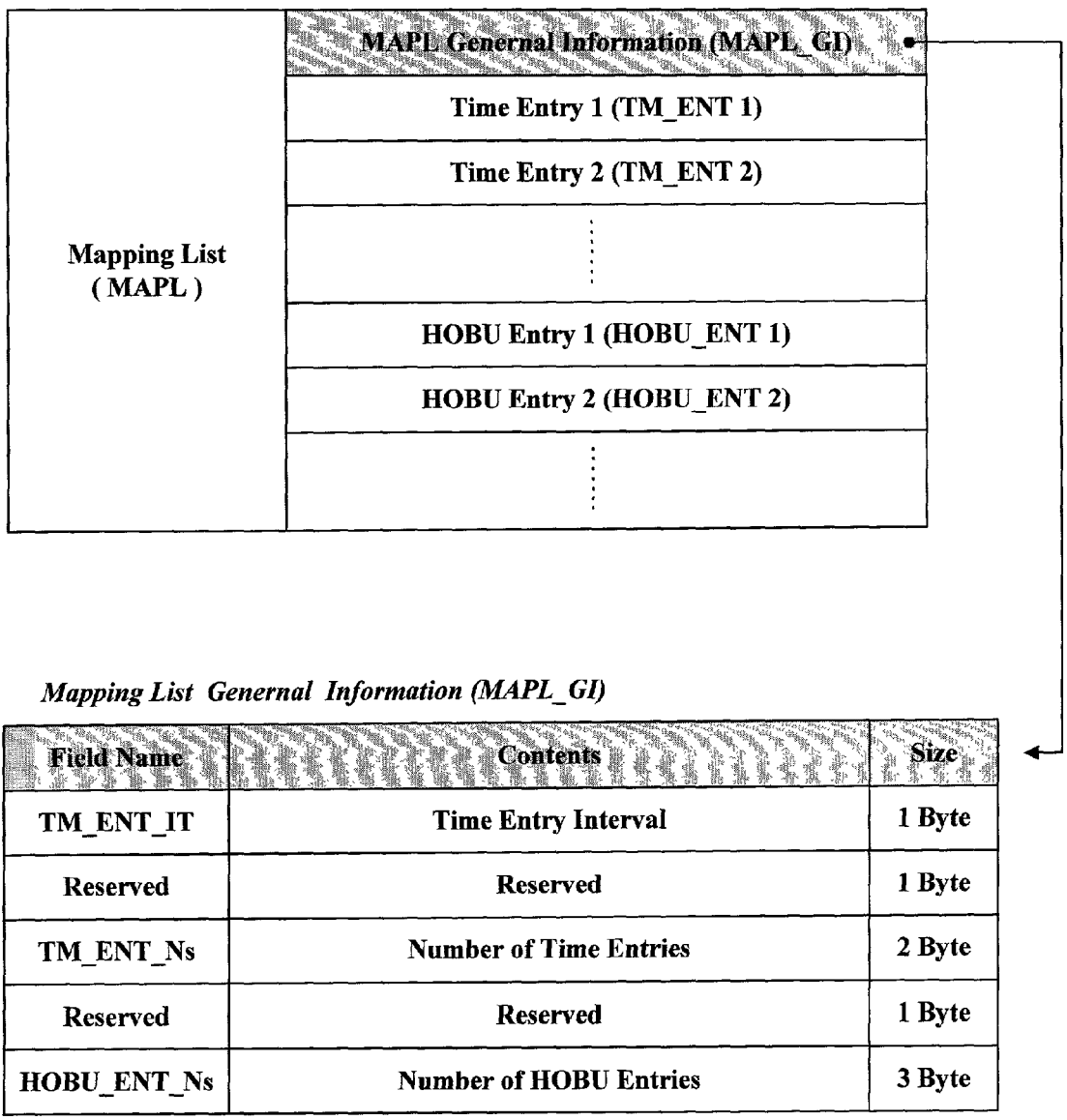
FIG. 2 shows structure of a mapping list.

FIG. 2 shows an overall structure of the MAPL which is composed of MAPL general information, HOBU entries for managing information on all HOBUs, and time entries including size and time length information and path information, wherein each time entry covers a predetermined number, which is defined in MAPL general information, of HOBUs.

The MAPL general information consists of 'Time Entry Interval' indicative of the number of HOBUs one time entry covers, for example 10, 'Number of Time Entries' included in this MAPL, and 'Number of HOBU Entries' included in this MAPL.

A time entry has a field syntax as shown in FIG. 3 according to the present invention. As fields of a time entry, there are Type of Time Entry 'TM_ENT_TY', Index Number of Start HOBU For This Time Entry 'ST_HOBU_IDX', Accumulated Size 'ACC_SZ', and Accumulated Time Length 'ACC_TM'. The 1-byte 'TM_ENT_TY' field is broken into 2-bit 'Stream Type' indicative of whether or not data stream of HOBUs this time entry covers is for multi-path, 4-bit 'Path Number' indicative of path number if corresponding HOBUs are for multi-path, and 2-bit 'Reserved'.

The 'ST_HOBU_IDX' has an index value pointing to a start HOBU of several HOBUs this time entry covers. The 'ACC_SZ' and 'ACC_TM' have information on accumulated size and time length, respectively, of preceding HOBUs before the start HOBU of this time entry. When accumulating the time length, those of HOBUs of only the same path are accumulated if the HOBUs contain multi-path data stream. Therefore, the time length of HOBUs the preceding time entries cover are excluded in calculating accumulated information for a current time entry if the path of the preceding time entries is different from that of the current one, whereas size of that HOBUs are included.

The value '00b' written in 2-bit 'Stream Type' represents that several HOBUs corresponding time entry covers are for uni-path, whereas '01b' represents multi-path.

FIG. 4 shows field syntax of a HOBU entry of the MAPL general information. The HOBU entry consists of '1STREF_SZ' field describing distance from the beginning of HOBU to the end address of the first I-picture, 'HOBU_SZ' field describing the size of this HOBU in sectors, 'GOP_Ns' field describing the number of GOP in this HOBU, and 'HOBU_PD' field describing the number of video fields in this HOBU.

Figure 5:
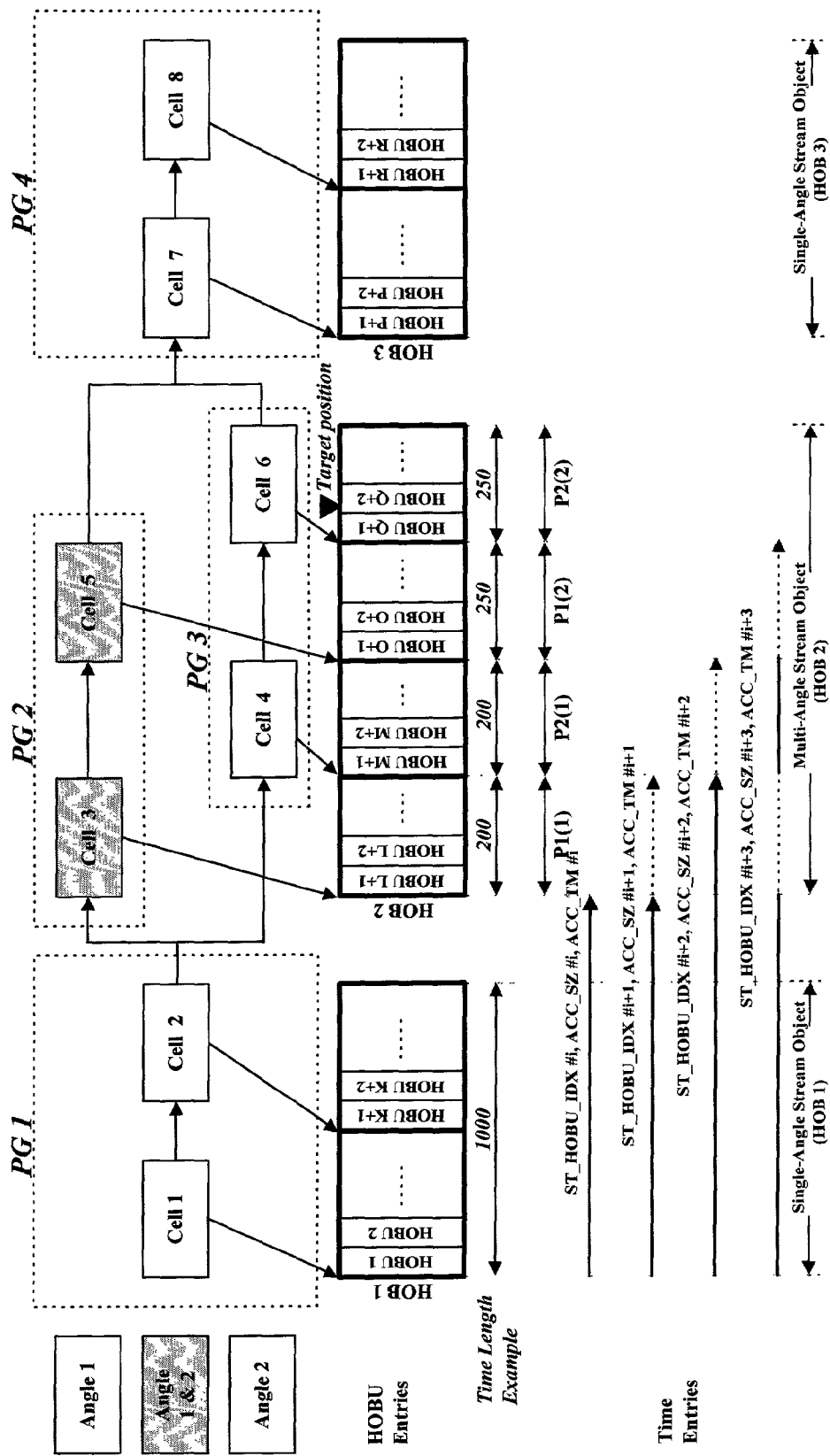
FIG. 5 shows a detailed example of recorded data stream and searching algorithm conducted therein.

FIG. 5 is detailed example of recorded data stream of FIG. 1 and schematically depicts information written in time entries for such-recorded data stream.

In the stream example of FIG. 5, the time entry #i+1 covering from the start HOBU (L+1) of program PG2 to next some, for example 9 HOBUs, which belong to the stream segment P1(1) cell 3 refers to, points the HOBU (L+1) with the 'ST_HOBU_IDX' field, and has, in the 'ACC_SZ' and 'ACC_TM' field, accumulated size and time length of the preceding HOBUs, that is, all HOBUs of HOB 1.

The time entry #i+2 covering from the start HOBU (M+1) of program PG3 to next some HOBUs, which belong to the stream segment P2(1) cell 4 refers to, points the HOBU (M+1) with its 'ST_HOBU_IDX' field like as the time entry #i+1. However, the time length of the stream segment P1(1) is not summed in calculating accumulated time length of preceding HOBUs for the 'ACC_TM' field of this time entry #i+2 because the path (angle) of stream segment P1(1) is different. Therefore, accumulated time length of all HOBUs of only HOB 1 are written in the 'ACC_TM' field of the time entry #i+2.

However, the summed size of the stream segment P1(1) is added to the size of HOB 1, and is then written in the 'ACC_SZ' field of the time entry #i+2 although two paths are different each other.

Like as the time entry #i+2, the time length of the stream segment P2(1) of path (angle) 2 cell 4 refers to is not accumulated for 'ACC_TM' field of the time entry #i+3 covering from the HOBU (O+1) to next some HOBUs containing data stream of path (angle) 1, and the time lengths of the stream segments P1(1) and P1(2) cells 3 and 5 refer to, respectively, are not accumulated either for 'ACC_TM' field of the time entry #i+4 covering from the HOBU (Q+1) to next some HOBUs.

In FIG. 5, the interval which should be excluded in calculating accumulated time length for said four time entries is marked with dotted line.

A HDVD containing multi-path data stream recorded according to the above-explained method is searched and reproduced as follows.

FIG. 6 shows a block diagram of a HDVD player being capable of searching and reproducing such-recorded HDVD. The HDVD player 100 of FIG. 6 comprises an optical pickup 12 reading signals recorded in a HDVD 11; an analog signal processor 13 binarizing the read signals after compensating levels of the signals; a digital signal processor 14 restoring the binarized signals into digital data and separating the restored data into presentation data containing A/V data and navigation data for reproduction control; an interfacing unit 15 sending the presentation data and PCI (Presentation Control Information) data according to the navigation data to a digital television 200 connected through IEEE 1394 standard; a controller 16 controlling the above elements according to the navigation data and/or user's commands; and a memory 17 storing data which are necessary for the control operation and are generated in data reproduction.

When a certain position is entered with a desirable angle as a target, the controller 16 refers to time entries of the MAPL stored in the memory 17 which has been read out from the HDVD 11 at initial driving step.

For a clearer explanation of searching operation for a given target according to the present invention, it is assumed that a target position is 1201 expressed in time which is within the stream interval defined by cell 5 of the program PG2 or the cell 6 of the program PG3 containing multi-path data stream.

When receiving a target position of 1201, the controller 16 reads time entries of MAPL stored in the memory 17 sequentially and compares the target time with the 'ACC_TM' of each time entry. While comparing the two time information, if the read value of 'ACC_TM' field exceeds the target time 1201, the controller 16 determines a time entry, that is, time entry #i+3 in the stream example of FIG. 5, right ahead of that time entry whose 'ACC_TM' exceeds the target time 1201, and checks the two MSBs of the field 'TM_ENT_TY' of the determined time entry. If the value of the two MSBs is '01b' for multi-path indication, then the controller 16 checks whether or not the 'Path (Angle) Number' written in the 'TM_ENT_TY' is identical to a path (angle) number entered when the target position was entered.

If the entered path number is 2, the controller 16 searches the MAPL again for a time entry whose 'ACC_TM' exceeds the target time 1201 since the path (angle) number of the time entry #i+3 is 1. Through this successive searching operation, the time entry #i+4 is found since its path number is same with the entered path number and its accumulated time of 1200 is closest to and does not exceed the target value of 1201. This means that the target position is in the HOBUs this time entry #i+4 covers. The controller 16 reads the accumulated size 'ACC_SZ' of the time entry #i+4, and then moves the pickup 12 to the start location of HOBU (Q+1) with reference to the read accumulated size and the index value written in 'ST_HOBU_IDX' field of the time entry #i+4.

If the recorded data stream is reproduced from the start point of the HOBU (Q+1) by the pickup 12, the controller 12 examines the navigation data from the digital signal processor 14 to exactly find where of the reproduced data stream is corresponding to the target location 1201.

In the above embodiment, the time entry has the fields 'ACC_SZ' and 'ACC_TM' in which size and time length accumulated from the start point of a video title set. However, another embodiment of a time entry can be implemented such that a time entry has incremental time length 'INC_TM' and incremental size field 'INC_SZ' in which time length and size of some HOBUs, whose number is defined in the field 'TM_ENT_IT' of MAPL general information, for example, 10 HOBUs that time entry covers are written, respectively. FIG. 7 shows field syntax of a time entry defined according to this another embodiment.

In this embodiment that incremental information is written in respective field instead of accumulated information, if a target position expressed in time is entered, the controller 16 sums up the 'INC_TM' and 'INC_SZ' from the first time entry sequentially until the summed time length exceeds the target time. In this summation, if the path (angle) number of a time entry is different from an entered path (angle) number, the incremental time length of that time entry is not summed whereas the incremental size is summed. And, if the target position is for uni-path so that a path number is not entered, only one path, for example path (angle) 1 is considered in the summation for time entries covering multi-path data stream of HOB 2. That is, 'INC_TM' of time entries for stream segments P1(1) and P1(2) are summed.

The such-summed time length is compared with the entered target time by the controller 16 to know whether it exceeds the target. If a time entry whose incremental time length makes the summed time length exceed the target time is determined through this comparison, the controller 16 conducts a rough search using the summed size subtracted by the incremental size of the determined time entry and the index value 'ST_HOBU_IDX' of the determined time entry, and conducts a fine search in which data stream is practically reproduced and its navigation data is examined to point at exact location of the reproduced data stream.

The multi-path stream supporting method and the data stream searching method according to the present invention, can make the searching information such as MAPL compatible with multi-path data stream, and prevent searching error which might be caused from multi-path data stream in a high-density DVD.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording a data stream including multi-path stream sections in a recording medium, comprising:
grouping the multi-path stream sections of the recorded data stream into a single stream object; and
providing a mapping list for accessing the multi-path stream sections in the single stream object,
wherein the mapping list includes:
time entry information for identifying a position of each multi-path stream section, said time entry information for a respective multi-path stream section including a cumulative sum of time lengths of preceding multi-path sections having a same path as the respective multi-path section.

2. The method set forth in claim 1, wherein the time entry information further includes location information indicating each boundary position between multi-path stream sections of different paths.

3. The method set forth in claim 2, wherein said time entry information further contains information notifying whether or not a corresponding data stream interval includes multi-path stream sections.

4. The method set forth in claim 3, wherein said time entry information further contains a path number if the corresponding data stream interval includes the multi-path stream sections.

5. The method set forth in claim 3, wherein said location information is an index number of a start stream object unit among stream object units constituting the data stream interval associated with said time entry.

6. A method of recording a data stream including multi-path stream sections in a recording medium, comprising:
grouping and recording the multi-path stream sections of the data stream into a single stream object; and
creating and recording time entries, each time entry having information on an accumulated size and time length of a preceding data stream section before a data stream interval each time entry covers.

7. The method set forth in claim 6, wherein the time length of a part of the preceding data stream section is summed in said accumulated time length information of each time entry, if path numbers of the part of preceding data stream section and corresponding data stream interval are the same, whereas the size of the preceding data stream section is summed in said accumulated size information of each time entry even if the path numbers are not the same.

8. A method of searching a data stream including multi-path stream sections recorded in a recording medium, comprising:
   (a) searching for a time entry whose accumulated time length is closest to a target value when a searching operation is requested;
   (b) checking whether a path information written in the time entry found in said step (a) is equal to an entered path number; and
   (c) searching for a location of a recorded data stream pointed to by an accumulated size information written in the found time entry, based on the checked result.

9. The method set forth in claim 8, further comprising reproducing the recorded data stream from the location found in said step (c), and determining where in the reproduced data stream is an exact position of the target value.

10. The method set forth in claim 8, wherein said step (c) searches for the location of the recorded data stream pointed to by the accumulated size information with reference to a location information written in the found time entry.

11. The method set forth in claim 10, wherein said location information is an index number of a stream object unit a corresponding time entry covers.

12. The method set forth in claim 8, wherein said step (a) searches for a time entry whose accumulated time length is smaller than and closest to the target value.

13. A method of searching data stream including multi-path stream sections recorded in a recording medium, comprising:
   (a) summing up an incremental time length and incremental size written in each time entry for a respective multipath stream section;
   (b) determining a time entry whose incremental time length makes the summed time length closest to a target value;
   (c) checking whether a path information written in the determined time entry is equal to an entered path number; and
   (d) searching for a location of the recorded data stream close to a position of the target value, based on the checked result.

14. The method set forth in claim 13, wherein said step (d) searches for the location of recorded data stream with reference to a location information written in the determined time entry and the summed time length subtracted by the incremental size of the determined time entry.

15. The method set forth in claim 14, wherein said location information is an index number of a stream object unit constituting the recorded data stream.

16. The method set forth in claim 13, further comprising reproducing the recorded data stream from the location found in said step (d), and determining where in the reproduced data stream is an exact position of the target value.

17. The method set forth in claim 13, wherein said step (b) determines a time entry whose incremental time length makes the summed time length become larger than the target value.

18. The method set forth in claim 13, wherein said step (a) sums the incremental time length of each time entry whose path information is the same if the time entry is for a multi-path data stream, and sums the incremental sizes of all preceding time entries irrespective of path information.

19. A recording medium containing recorded data to be reproduced by a video player, said recording medium comprising:
   a number of stream object units constituting a data stream, wherein multi-path stream section sections of the data stream is are grouped into a single stream object; and
   a mapping list for accessing the multi-path stream sections in the single stream object, said mapping list including time entry information for identifying a position of each multi-path stream section, said time entry information for a respective multi-path stream section including a cumulative sum of time lengths of preceding multi-path sections having a same path as the respective multi-path section, said video player using the mapping list for accessing the multi-path stream sections.

20. The recording medium set forth in claim 19, wherein said time entry information further contains path identifying data and information notifying whether or not a corresponding data stream interval each time entry information covers includes the multi-path stream sections.

21. The recording medium set forth in claim 19, wherein said time entry contains accumulated time length and size of a preceding data stream before a data stream interval said time entry covers.

22. The recording medium set forth in claim 19, wherein said time entry contains an incremental time length and size of a data stream interval said time entry covers.

* * * * *